(12) United States Patent
Ozeki

(10) Patent No.: US 12,346,094 B2
(45) Date of Patent: Jul. 1, 2025

(54) CONTROL DEVICE, AND CONTROL METHOD

(71) Applicant: FANUC CORPORATION, Yamanashi (JP)

(72) Inventor: Shinichi Ozeki, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 377 days.

(21) Appl. No.: 17/915,357

(22) PCT Filed: Apr. 14, 2021

(86) PCT No.: PCT/JP2021/015410
§ 371 (c)(1),
(2) Date: Sep. 28, 2022

(87) PCT Pub. No.: WO2021/215320
PCT Pub. Date: Oct. 28, 2021

(65) Prior Publication Data
US 2023/0140903 A1 May 11, 2023

(30) Foreign Application Priority Data
Apr. 21, 2020 (JP) ................................ 2020-075444

(51) Int. Cl.
*G05B 19/4155* (2006.01)
(52) U.S. Cl.
CPC ............ *G05B 19/4155* (2013.01); *G05B 2219/35519* (2013.01)
(58) Field of Classification Search
None
See application file for complete search history.

(56) References Cited

U.S. PATENT DOCUMENTS

| | | | | |
|---|---|---|---|---|
| 2011/0015771 A1* | 1/2011 | Guo | ................... | G05B 19/4063 700/97 |
| 2015/0112475 A1* | 4/2015 | Murakawa | ............. | G05B 19/19 700/189 |
| 2018/0203430 A1* | 7/2018 | Kageyama | ......... | G05B 19/4067 |

FOREIGN PATENT DOCUMENTS

| | | |
|---|---|---|
| JP | 09-230921 | 9/1997 |
| JP | 2001-014012 | 1/2001 |
| JP | 2007-188170 A | 7/2007 |
| JP | 2009-181174 | 8/2009 |

(Continued)

OTHER PUBLICATIONS

International Search Report issued Jun. 8, 2021 in International (PCT) Application No. PCT/JP2021/015410, with English translation.

*Primary Examiner* — Ryan A Jarrett
(74) *Attorney, Agent, or Firm* — Wenderoth, Lind & Ponack, L.L.P.

(57) ABSTRACT

The objective of the present invention is to ascertain easily a positional relationship between a tool and a workpiece in a machining program, in order to stop a machine tool in accordance with the purpose. This control device for controlling a machine tool on the basis of a machining program is provided with an extracting unit for extracting, from blocks included in the machining program, a block of the machining program in which the tool and the workpiece in the machine tool are in a predetermined state, as a stopping position candidate, in accordance with the purpose of stopping the machine tool.

6 Claims, 11 Drawing Sheets

(56) References Cited

FOREIGN PATENT DOCUMENTS

| JP | 2015-079384 | 4/2015 |
| JP | 2016-078207 | 5/2016 |

* cited by examiner

FIG. 2

(ROUTING)
(1) G90 G54 G00 X0.0 Y0.0 S500;
(2) Z5.0 M03;
(3) G41 X60.0 Y30.0 D01;

(4) G01 Z-27.0 F2000 M08;
(5) Y120.0;
(6) X180.0;
(7) Y40.0;
(8) X50.0;

(9) G00 Z5.0 M09;
(10) G40 X0.0 Y0.0;
(11) Z70.0;

(TOOL CHANGE)
(12) T02;
(13) M06;

(DRILLING)
(14) G90 G54 G00 X0.0 Y0.0 S500;
(15) X120.0 Y80.0;
(16) Z5.0 M03;

| SEQUENCE NUMBER | x(mm) | y(mm) | z(mm) | D² | D(mm) | DEGREE OF SEPARATION |
|---|---|---|---|---|---|---|
| (1) | 0 | 0 | 700 | 487525 | 698.2 | FAR |
| (2) | 0 | 0 | 5 | 4500 | 67.1 | MEDIUM |
| (3) | 60 | 30 | 5 | 0 | 0 | CLOSE |
| (4) | | | | | | CONTACT |
| (5) | | | | | | CONTACT |
| (6) | | | | | | CONTACT |
| (7) | | | | | | CONTACT |
| (8) | 50 | 40 | -27 | 0 | 0 | CLOSE |
| (9) | 50 | 40 | 5 | 1024 | 32 | CLOSE |
| (10) | 0 | 0 | 5 | 5124 | 71.6 | MEDIUM |
| (11) | 0 | 0 | 70 | 13509 | 116.2 | FAR |
| (12) | | | | | | FAR |
| (13) | | | | | | FAR |
| (14) | 0 | 0 | 700 | 503825 | 709.8 | FAR |
| (15) | 120 | 80 | 700 | 483025 | 695 | MEDIUM |
| (16) | 120 | 80 | 5 | 0 | 0 | CLOSE |
| (17) | | | | | | CONTACT |
| (18) | 120 | 80 | 5 | 0 | 0 | CLOSE |
| (19) | 120 | 80 | 70 | 4225 | 65 | MEDIUM |
| (20) | 0 | 0 | 70 | 25025 | 158.2 | FAR |

```
(ROUTING)
(1) G90 G54 G00 X0.0 Y0.0 S500;
(2) Z5.0 M03;
(3) G41 X60.0 Y30.0 D01;

(4) G01 Z-27.0 F2000 M08;
(5) Y120.0;
(6) X180.0;
(7) Y40.0;
(8) X50.0;

(9) G00 Z5.0 M09;
(10) G40 X0.0 Y0.0;
(11) Z70.0;

(TOOL CHANGE)
(12) T02;
(13) M06;

(DRILLING)
(14) G90 G54 G00 X0.0 Y0.0 S500;
(15) X120.0 Y80.0;
(16) Z5.0 M03;

(17) G01 Z-27.0 F200 M08;
(18) Z5.0;

(19) G00 Z70.0;
(20) X0.0 Y0.0;
     M30;
```

CONTROL DEVICE, AND CONTROL METHOD

TECHNICAL FIELD

The present invention relates to a control device and a control method.

BACKGROUND ART

It is necessary in a factory to stop a running machining program in the middle of the run in order to perform diameter adjustment for a boring tool, paste application to a tool, or chip removal with respect to a machine tool engaged in machining operation.

In a known method for stopping a running machining program in the middle of the run, a pause instruction "Program stop (M00)" or "Optional stop (M01)" is inserted into the machining program.

In this regard, it is known in the art to pause automatic operation of a machine tool when the necessity arises without inserting a pause instruction into a machining program, in a case where a command block that is considered safe is executed from among non-machining blocks in the machining program or in a case where the machine tool changes from an operating state to, for example, a non-cutting state. See, for example, Patent Document 1.

Patent Document 1: Japanese Unexamined Patent Application, Publication No. 2015-79384

DISCLOSURE OF THE INVENTION

Problems to be Solved by the Invention

Stopping a machine tool with a tool therein in contact with a workpiece results in damage to either or both of the tool and the workpiece. However, for the diameter adjustment for a boring tool, the paste application to a tool, or the chip removal mentioned above, for example, a pause instruction for causing a stop cannot be simply placed anywhere between cutting and positioning in a machining program. In the case of the diameter adjustment for a boring tool, for example, the tool and the workpiece need to have an enough distance therebetween. In the case of the paste application to a tool, the tool and the workpiece need to have a certain distance therebetween, but the distance does not need to be as long as the distance in the case of the diameter adjustment for a boring tool. In the case of the chip removal, a minimum requirement is that the tool and the workpiece are out of contact with each other.

However, it is burdensome for an operator to determine the positional relationship between the tool and the workpiece, and to determine where in the machining program to place a pause instruction according to the purpose of stopping the machine tool.

In order to stop the machine tool appropriately according to the purpose, therefore, it is desirable to easily recognize the positional relationship between the tool and the workpiece in the machining program.

Means for Solving the Problems (1) A control device according to an aspect of the present disclosure is a control device for controlling a machine tool based on a machining program, the control device including an extraction unit configured to extract, as candidate stop positions from among blocks included in the machining program, blocks from the machining program that cause a tool and a workpiece in the machine tool to be in a predetermined state according to a purpose of stopping the machine tool.

(2) A control method according to another aspect of the present disclosure is a control method of a control device for controlling a machine tool based on a machining program, the control method including an extraction step of extracting, as candidate stop positions from among blocks included in the machining program, blocks from the machining program that cause a tool and a workpiece in the machine tool to be in a predetermined state according to a purpose of stopping the machine tool.

Effects of the Invention

According to an aspect, it is possible to easily recognize the positional relationship between a tool and a workpiece in a machining program in order to stop a machine tool according to the purpose.

BRIEF DESCRIPTION OF THE DRAWINGS

FIG. 2 is a diagram showing an example of a machining program;

FIG. 5 is a diagram showing an example of a distance table;

PREFERRED MODE FOR CARRYING OUT THE INVENTION

The following describes a first embodiment with reference to the drawings. Herein, a machining program that covers routing and drilling is described as an example. It should be noted that the present invention is not limited to the machining program that covers routing and drilling, and is applicable to any machining programs that cover other types of machining.

First Embodiment

Figure 1:
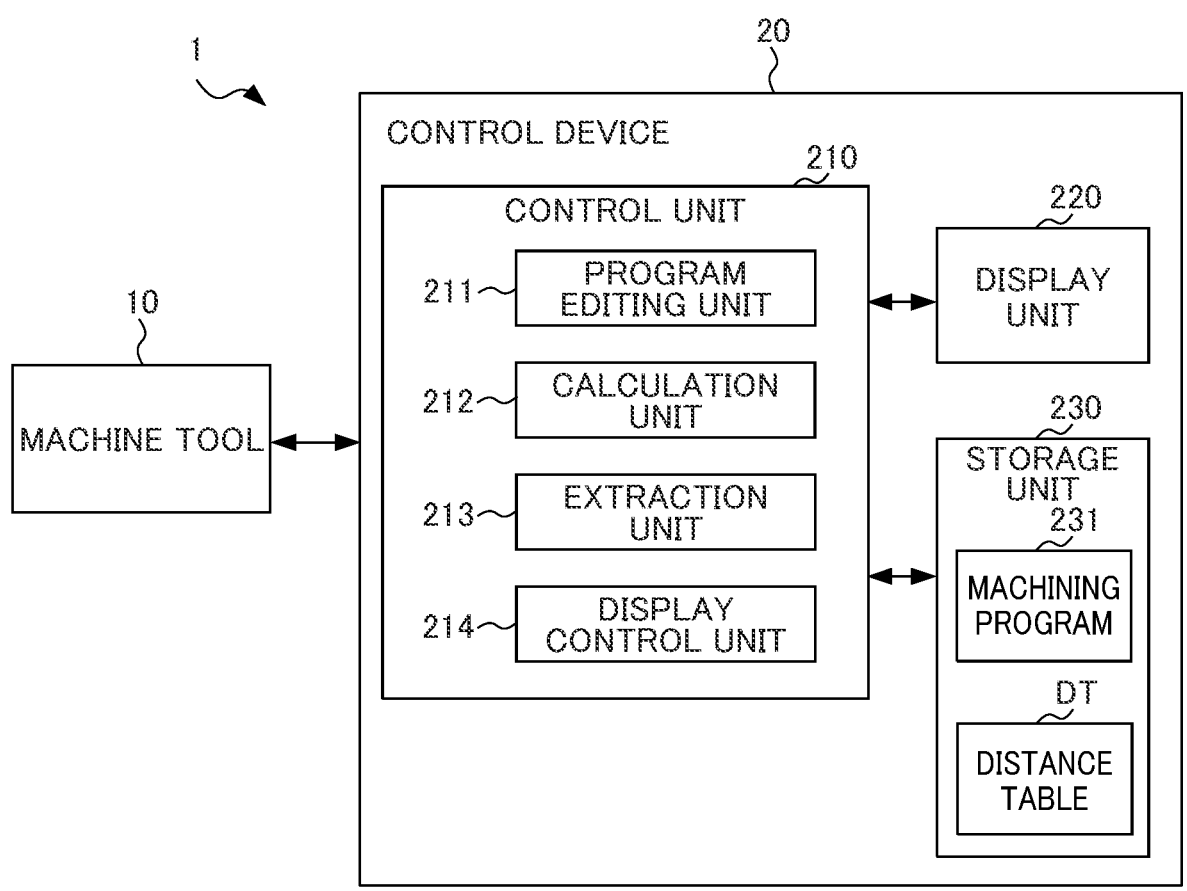
FIG. 1 is a functional block diagram showing a functional configuration example of a control system according to a first embodiment.

FIG. 1 is a functional block diagram showing a functional configuration example of a control system according to the first embodiment. As shown in FIG. 1, a control system 1 includes a machine tool 10 and a control device 20.

The machine tool 10 and the control device 20 may be directly connected to each other through a connection interface, not shown. Alternatively, the machine tool 10 and the control device 20 may be connected to each other via a network such as a local area network (LAN). In this case, the machine tool 10 and the control device 20 may each have a communication unit, not shown, for communicating with each other through such a connection.

It should be noted that the control device 20 may be included in the machine tool 10.

The machine tool 10 is a machine tool known to those skilled in the art and operates based on an operation command from the control device 20.

<Control Device 20>

The control device 20 is a numerical control device known to those skilled in the art. The control device 20 generates an operation command based on an operator's instruction received through an input device (not shown) such as a touch panel included in the control device 20 or based on a running machining program, and transmits the generated operation command to the machine tool 10. In this way, the control device 20 controls the operation of the machine tool 10.

As shown in FIG. 1, the control device 20 has a control unit 210, a display unit 220, and a storage unit 230. The control unit 210 includes a program editing unit 211, a calculation unit 212, an extraction unit 213, and a display control unit 214. The storage unit 230 stores therein a machining program 231 and a distance table DT. The description herein uses a machining program shown in FIG. 2, which is described below, as an example of the machining program 231.

The display unit 220 is a display device such as a liquid crystal display (LCD), and displays the machining program 231 being edited by the program editing unit 211 described below or the machining program 231 being executed by the control device 20.

The storage unit 230 is, for example, read only memory (ROM) or a hard disk drive (HDD), and may store therein the machining program 231 and the distance table DT as well as various control programs.

The machining program 231 may be, for example, obtained from an external device (not shown) such as a CAD/CAM device or created in the control device 20 by the operator.

FIG. 2 is a diagram showing an example of the machining program 231.

The machining program 231 in FIG. 2 implements routing in the first blocks of sequence numbers (1) to (11). It should be noted that a trimming tool (for example, tool number T01) is attached to a spindle (not shown) in the machine tool 10.

Figure 3A:
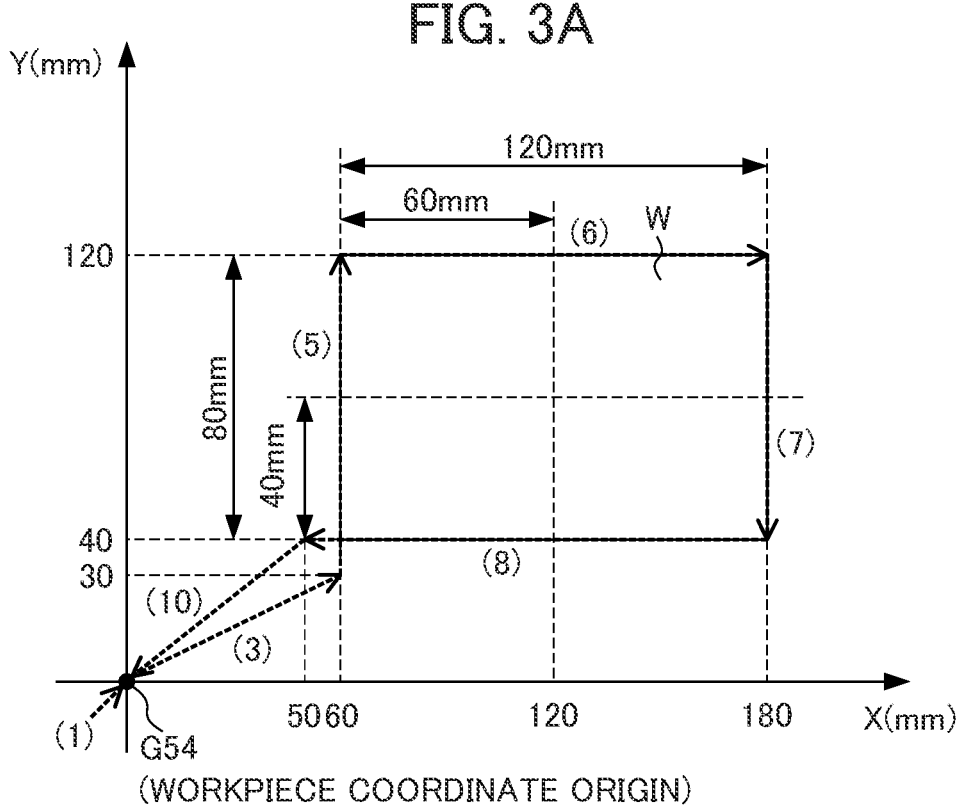
FIG. 3A is a diagram showing an example of a tool trajectory in an XY plane in routing in accordance with the machining program in FIG. 2.
Figure 3B:
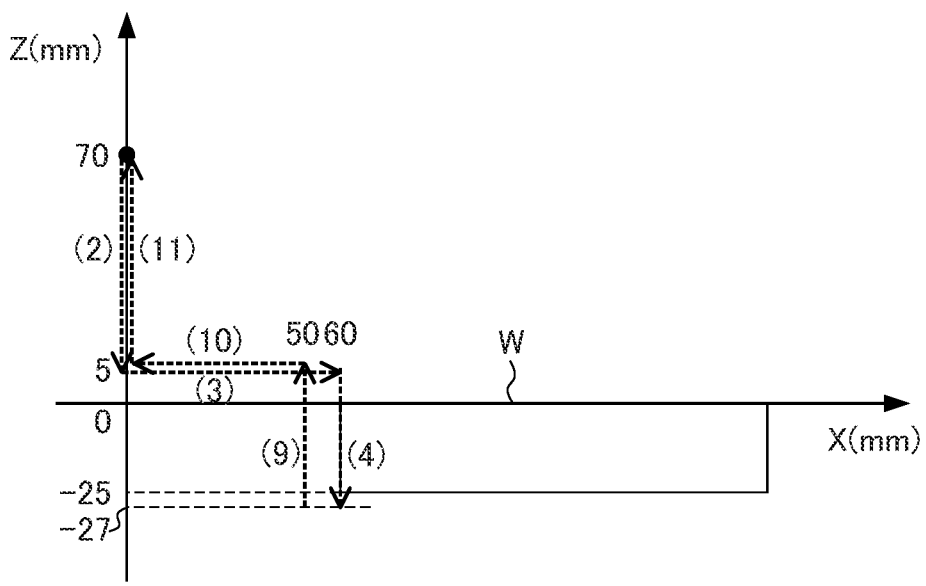
FIG. 3B is a diagram showing an example of a tool trajectory in an XZ plane in the routing in accordance with the machining program in FIG. 2.

FIG. 3A is a diagram showing an example of a tool trajectory in an XY plane in routing in accordance with the machining program 231 in FIG. 2. FIG. 3B is a diagram showing an example of a tool trajectory in an XZ plane in the routing in accordance with the machining program 231 in FIG. 2. It should be noted that parenthesized numbers in FIGS. 3A and 3B indicate sequence numbers in the machining program 231 and represent the order of tool movement. A workpiece W is a machining object and has, for example, a size of 120 mm in length, 80 mm in width, and 25 mm in thickness.

After the routing, the machining program 231 causes tool change from the trimming tool to a drilling tool (for example, tool number T02) in sequence numbers (12) and (13), and drilling is performed in sequence numbers (14) to (20).

Figure 4A:
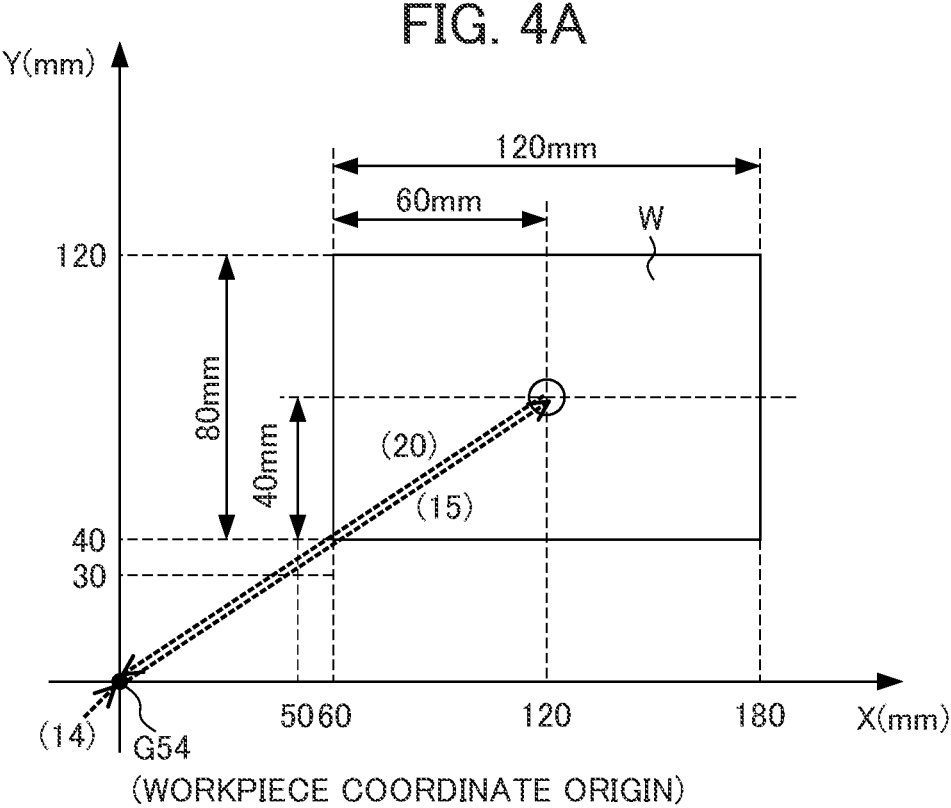
FIG. 4A is a diagram showing an example of a tool trajectory in the XY plane in drilling in accordance with the machining program in FIG. 2.
Figure 4B:
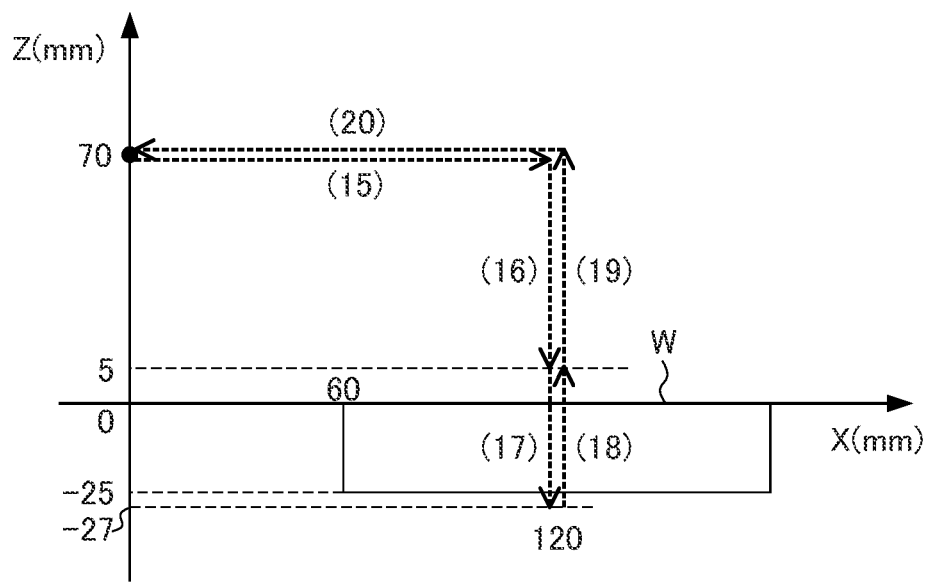
FIG. 4B is a diagram showing an example of a tool tip trajectory in the XZ plane in the drilling in accordance with the machining program in FIG. 2.

FIG. 4A is a diagram showing an example of a tool trajectory in the XY plane in the drilling in accordance with the machining program 231 in FIG. 2. FIG. 4B is a diagram showing an example of a tool tip trajectory in the XZ plane in the drilling in accordance with the machining program 231 in FIG. 2. It should be noted that parenthesized numbers in FIGS. 4A and 4B indicate sequence numbers in the machining program 231 and represent the order of tool movement.

The distance table DT contains, for example, the distance between the tool and the workpiece W in each of blocks of sequence numbers including a predetermined code G00. The distance is calculated by the calculation unit 212, which is described below, based on the machining program 231 in FIG. 2. The distance table DT will be described below.

<Control Unit 210>

The control unit 210 has, for example, a central processing unit (CPU), ROM, random access memory (RAM), and complementary metal-oxide-semiconductor (CMOS) memory known to those skilled in the art, which are configured to communicate with one another via a bus.

The CPU is a processor that performs overall control of the control device 20. The CPU reads a system program and an application program stored in the ROM via the bus, and performs overall control of the control device 20 in accordance with the system program and the application program. Thus, as shown in FIG. 1, the control unit 200 is configured to implement functions of the program editing unit 211, the calculation unit 212, the extraction unit 213, and the display control unit 214. Various data such as temporary calculation data and display data is stored in the RAM. The CMOS memory is backed up by a battery, not shown, and is configured to serve as nonvolatile memory that retains stored information even when the control device 20 is turned off.

The program editing unit 211 edits the machining program 231 displayed on the display unit 220 based on, for example, the operator's input operation received through the input device (not shown) such as a keyboard or a touch panel included in the control device 20.

Specifically, based on the operator's input operation, the program editing unit 211 inserts, for example, a pause instruction "M00" or "M01" into the machining program 231 according to the purpose such as diameter adjustment for a boring tool, paste application to a tool, or chip removal.

The calculation unit 212 calculates the distance between the tool and the workpiece W for each of code blocks including the predetermined code G00 in the machining program 231, and determines the degree of separation between the tool and the workpiece based on comparison of the calculated distance against preset thresholds.

For example, the blocks of sequence numbers (1) to (3) include the predetermined code G00 for rapid traverse in the machining program 231 in FIG. 2. The coordinates at the end of the rapid traverse in accordance with G00 in the block of sequence number (3) are coordinates where cutting starts in accordance with G01 in the block of sequence number (4) for starting the routing. That is, in the blocks of sequence numbers (4) to (8), the tool is in contact with the workpiece W due to the routing.

The calculation unit 212 therefore uses, for example, the coordinates (x, y, z) (=(60, 30, 5)) at the end of the block of sequence number (3) as approximate values of the position of the workpiece W and calculates, as the distance between the tool and the workpiece W, the distance from the coordinates at the end of each of the blocks of sequence numbers (1) to (3) to the coordinates at the end of the block of sequence number (3).

Specifically, for example, the coordinates (x, y, z) at the end of the block of sequence number (1) are (0, 0, 700) as shown in FIGS. 3A and 3B, and the calculation unit 212 accordingly calculates the distance from the coordinates at the end of the block of sequence number (1) to the coordinates at the end of the block of sequence number (3), which is sqrt(($60-0$)$^2$+($30-0$)$^2$+($5-700$)$^2$)=698.2 (mm), as a distance D between the tool and the workpiece W. For another example, the coordinates (x, y, z) at the end of the block of sequence number (2) are (0, 0, 5), and the calculation unit 212 accordingly calculates the distance from the coordinates at the end of the block of sequence number (2) to the coordinates at the end of the block of sequence number (3), which is sqrt(($60-0$)$^2$+($30-0$)$^2$+($5-5$)$^2$)=67.1 (mm), as the distance D between the tool and the workpiece W. For another example, the calculation unit 212 calculates the distance from the coordinates at the end of the block of sequence number (3) to the coordinates at the end of the block of sequence number (3), which is sqrt(($60-60$)$^2$+($30-30$)$^2$+($5-5$)$^2$)=0 (mm), as the distance D between the tool and the workpiece W.

Next, the coordinates (x, y, z) (=(50, 40, −27)) at the end of the block of sequence number (8) are coordinates where the movement of rapid traverse starts in accordance with G00 in the block of sequence number (9) in the machining program 231 in FIG. 2. The calculation unit 212 therefore uses, for example, the coordinates at the end of the block of sequence number (8) as approximate values of the position of the workpiece W and calculates, as the distance between the tool and the workpiece W, the distance from the coordinates at the end of each of the blocks of sequence numbers (8) to (11) to the coordinates at the end of the block of sequence number (8).

That is, the calculation unit 212 calculates the distance from the coordinates at the end of the block of sequence number (8) to the coordinates at the end of the block of sequence number (8), which is sqrt(($50-50$)$^2$+($40-40$)$^2$+($-27-(-27)$)$^2$)=0 (mm), as the distance D between the tool and the workpiece W. The coordinates (x, y, z) at the end of the block of sequence number (9) are (50, 40, 5), and the calculation unit 212 accordingly calculates the distance from the coordinates at the end of the block of sequence number (9) to the coordinates at the end of the block of sequence number (8), which is sqrt(($50-50$)$^2$+($40-40$)$^2$+($-27-5$)$^2$)=32 (mm), as the distance D between the tool and the workpiece W. The coordinates (x, y, z) at the end of the block of sequence number (10) are (0, 0, 5), and the calculation unit 212 accordingly calculates the distance from the coordinates at the end of the block of sequence number (10) to the coordinates at the end of the block of sequence number (8), which is sqrt(($50-0$)$^2$+($40-0$)$^2$+($-27-5$)$^2$)=71.6 (mm), as the distance D between the tool and the workpiece W. The coordinates (x, y, z) at the end of the block of sequence number (11) are (0, 0, 70), and the calculation unit 212 accordingly calculates the distance from the coordinates at the end of the block of sequence number (11) to the coordinates at the end of the block of sequence number (8), which is sqrt(($50-0$)$^2$+($40-0$)$^2$+($-27-70$)$^2$)=116.2 (mm), as the distance D between the tool and the workpiece W.

The coordinates (x, y, z) (=(120, 80, 5)) at the end of the rapid traverse in accordance with G00 in the block of sequence number (16) are coordinates where the drilling starts in accordance with G01 in the block of sequence number (17) in the machining program 231 in FIG. 2. The calculation unit 212 therefore uses, for example, the coordinates at the end of the block of sequence number (16) as approximate values of the position of the workpiece W and calculates, as the distance between the tool and the workpiece W, the distance from the coordinates at the end of each of the blocks of sequence numbers (14) to (16) to the coordinates at the end of the block of sequence number (16).

Specifically, the coordinates (x, y, z) at the end of the block of sequence number (14) are (0, 0, 700), and the calculation unit 212 accordingly calculates the distance from the coordinates at the end of the block of sequence number (14) to the coordinates at the end of the block of sequence number (16), which is sqrt(($120-0$)$^2$+($80-0$)$^2$+($5-700$)$^2$)=709.8 (mm), as the distance D between the tool and the workpiece W. The coordinates (x, y, z) at the end of the block of sequence number (15) are (120, 80, 700), and the calculation unit 212 accordingly calculates the distance from the coordinates at the end of the block of sequence number (15) to the coordinates at the end of the block of sequence number (16), which is sqrt(($120-120$)$^2$+($80-80$)$^2$+($5-700$)$^2$)=695 (mm), as the distance D between the tool and the workpiece W. The calculation unit 212 calculates the distance from the coordinates at the end of the block of sequence number (16) to the coordinates at the end of the block of sequence number (16), which is sqrt(($120-120$)$^2$+($80-80$)$^2$+($5-5$)$^2$)=0 (mm), as the distance D between the tool and the workpiece W.

The coordinates (x, y, z) (=(120, 80, 5)) at the end of the block of sequence number (18) are coordinates where the movement of rapid traverse starts in accordance with G00 in the block of sequence number (19) in the machining program 231 in FIG. 2. The calculation unit 212 therefore uses, for example, the coordinates at the end of the block of sequence number (18) as approximate values of the position of the workpiece W and calculates, as the distance between the tool and the workpiece W, the distance from the coordinates at the end of each of the blocks of sequence numbers (18) to (20) to the coordinates at the end of the block of sequence number (18).

Specifically, the calculation unit 212 calculates the distance from the coordinates at the end of the block of sequence number (18) to the coordinates at the end of the block of sequence number (18), which is sqrt(($120-120$)$^2$+($80-80$)$^2$+($5-5$)$^2$)=0 (mm), as the distance D between the tool and the workpiece W. The coordinates (x, y, z) at the end of the block of sequence number (19) are (120, 80, 70), and the calculation unit 212 accordingly calculates the distance from the coordinates at the end of the block of sequence number (19) to the coordinates at the end of the block of sequence number (18), which is sqrt(($120-120$)$^2$+($80-80$)$^2$+($5-70$)$^2$)=65 (mm), as the distance D between the tool and the workpiece W. The coordinates (x, y, z) at the end of the block of sequence number (20) are (0, 0, 70), and the calculation unit 212 accordingly calculates the distance from the coordinates at the end of the block of sequence number (20) to the coordinates at the end of the block of sequence number (18), which is sqrt(($(120-0)^2+(80-0)^2+(5-70)^2$) =158.2 (mm), as the distance D between the tool and the workpiece W.

The calculation unit 212 stores the calculated distance D between the tool and the workpiece W and other information in the distance table DT in the storage unit 230.

FIG. 5 is a diagram showing an example of the distance table DT.

As shown in FIG. 5, the distance table DT contains coordinates "x", "y", and "z" at the end of each of the blocks of sequence numbers, a square value "$D^2$" of the distance between the tool and the workpiece W, the distance "D" between the tool and the workpiece W, and the "Degree of separation". It should be noted that in FIG. 5, each of blocks of sequence numbers having a period in which the tool is in contact with the workpiece W is indicated by shading, and cells for "x", "y", "z", "$D^2$", and "D" are left blank if the tool is in contact with the workpiece W at the end of such a block of sequence number.

The blocks of sequence numbers (12) and (13) are for tool change, and each include a different code from the predetermined code G00. Cells for "x", "y", "z", "$D^2$", and "D" of sequence numbers (12) and (13) are therefore left blank.

Values of the x-coordinate, the y-coordinate, and the z-coordinate at the end of each of the blocks of sequence numbers are respectively stored as the coordinates "x", "y", and "z" in the distance table DT.

A square value of the distance D between the tool and the workpiece W calculated for each of the blocks of sequence numbers by the calculation unit 212 is stored as "$D^2$" in the distance table DT.

The distance D between the tool and the workpiece W calculated for each of the blocks of sequence numbers by the calculation unit 212 is stored as "D" in the distance table DT.

"Contact", "Close", "Medium", or "Far" is stored as "Degree of separation" in the distance table DT based on the comparison of the calculated distance D between the tool and the workpiece W against the preset thresholds.

Figure 6:
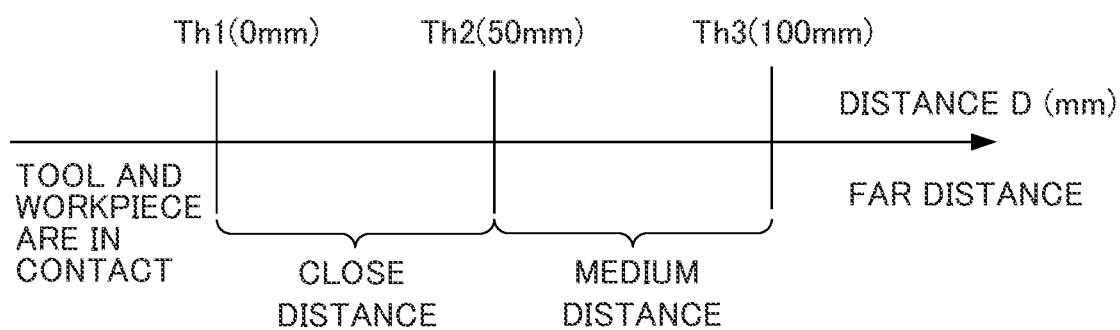
FIG. 6 is a diagram showing an example of the degree of separation.

FIG. 6 is a diagram showing an example of the degree of separation.

As shown in FIG. 6, if the calculated distance D between the tool and the workpiece W is less than a threshold Th1 (for example, 0 mm), the calculation unit 212 determines "Degree of separation" to be "Contact" and stores such information in the distance table DT, because the tool is in contact with the workpiece W. As described above, the calculation unit 212 does not calculate the distance D between the tool and the workpiece W if the tool is in contact with the workpiece W at the end of the block. In this case, the calculation unit 212 may determine "Degree of separation" to be "Contact" if the tool being in contact with the workpiece W is detected at the end of the block.

If the calculated distance D between the tool and the workpiece W is equal to or greater than the threshold Th1 and less than a threshold Th2 (for example, 50 mm), the calculation unit 212 may determine "Degree of separation" to be "Close" and stores such information in the distance table DT, because the tool is close to the workpiece W in distance. If the calculated distance D between the tool and the workpiece W is equal to or greater than the threshold Th2 and less than a threshold Th3 (for example, 100 mm), the calculation unit 212 may determine "Degree of separation" to be "Medium" and stores such information in the distance table DT, because the tool is at a medium distance from the workpiece W. If the calculated distance D between the tool and the workpiece W is equal to or greater than the threshold Th3, the calculation unit 212 may determine "Degree of separation" to be "Far" and stores such information in the distance table DT, because the tool is far from the workpiece W in distance.

It should be noted that the thresholds Th1, Th2, and Th3 may be determined appropriately depending on the configuration of the machine tool 10 or the shape and the size of the workpiece W.

In the blocks of sequence numbers (12) and (13) for tool change, the tool change is performed at a predetermined position far enough away from the workpiece W using, for example, a tool magazine (not shown) included in the machine tool 10, and the coordinates do not change. The calculation unit 212 may therefore determine "Degree of separation" for the blocks of sequence numbers (12) and (13) to be "Far", and store such information in the distance table DT.

The extraction unit 213 extracts, as candidate stop positions from among the blocks included in the machining program 231, blocks from the machining program 231 that cause the tool and the workpiece W in the machine tool 10 to be in a predetermined state according to the purpose of stopping the machine tool 10, such as diameter adjustment for a boring tool, paste application to a tool, or chip removal.

Specifically, in a case where the operator selects the diameter adjustment for a boring tool through the input device (not shown) of the control device 20, for example, the extraction unit 213 extracts, as candidate stop positions, blocks of sequence numbers having a degree of separation of "Far" as a predetermined state, which indicates that the distance D between the tool and the workpiece W is long enough for at least the diameter adjustment for the boring tool to be performed.

For another example, in a case where the operator selects the paste application to a tool through the input device (not shown) of the control device 20, the extraction unit 213 may extract, as candidate stop positions, blocks of sequence numbers having a degree of separation of "Medium" or "Far" as a predetermined state, which indicates that the distance D between the tool and the workpiece W is long enough for at least the paste application to the tool to be performed. For another example, in a case where the operator selects the chip removal through the input device (not shown) of the control device 20, the extraction unit 213 may extract, as candidate stop positions, blocks of sequence numbers having a degree of separation of "Close", "Medium" or "Far" as a predetermined state, which indicates that the distance D between the tool and the workpiece W is long enough for at least the chip removal to be performed.

The display control unit 214 displays, on the display unit 220, each of the blocks extracted from the machining program 231 as the candidate stop positions in a highlighted manner according to the purpose or the degree of separation.

Specifically, the display control unit 214 displays, on the display unit 220, the machining program 231 in a highlighted display manner to distinguish the extracted blocks using, for example, border color, border type, border thickness, and background color according to the purpose selected by the operator, such as diameter adjustment for a boring tool, paste application to a tool, or chip removal.

Figure 7:
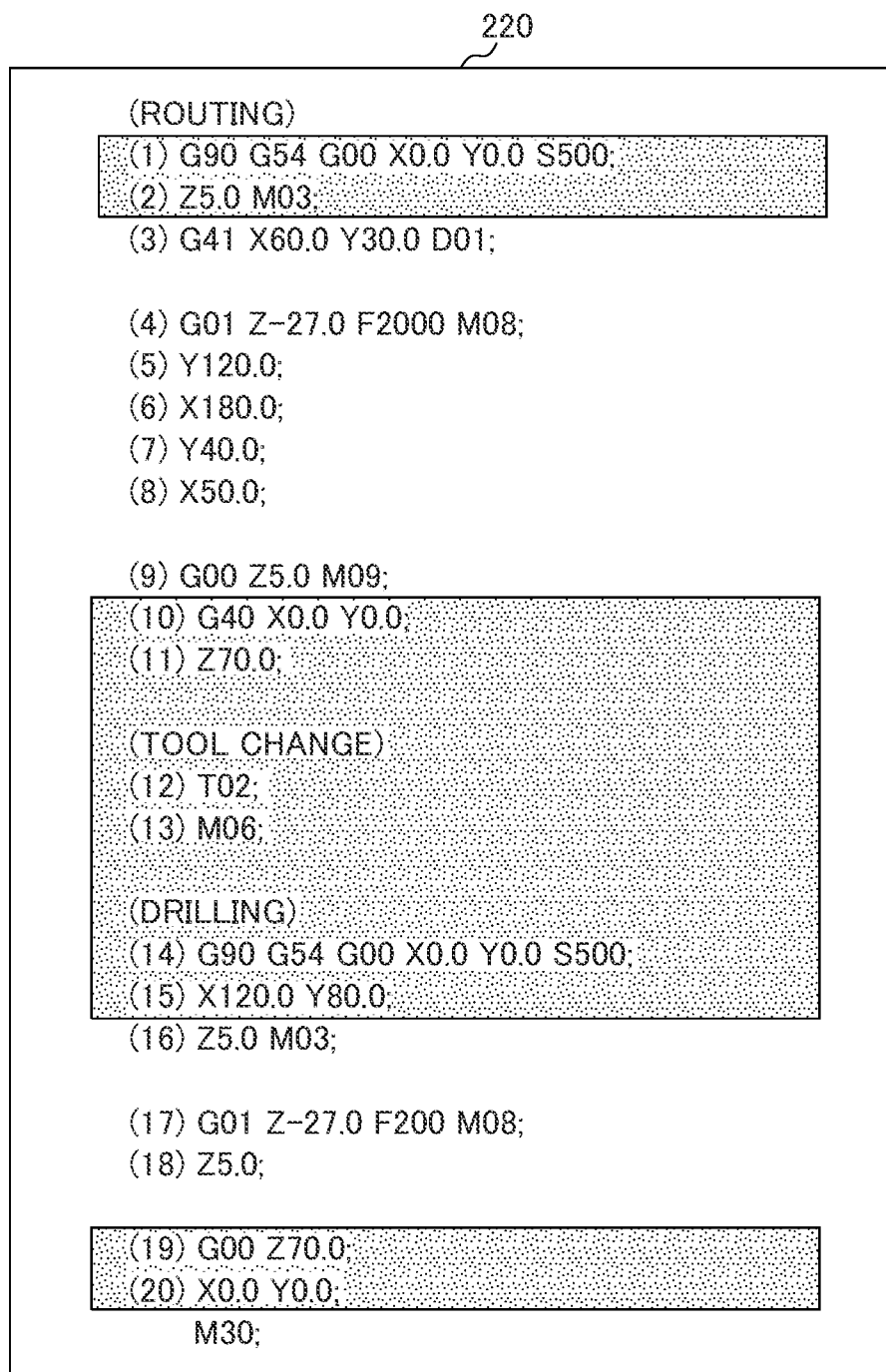
FIG. 7 is a diagram showing an example of the machining program being displayed in a highlighted manner in a case where paste application to a tool is selected.

FIG. 7 is a diagram showing an example of the machining program 231 being displayed in a highlighted manner in a case where the paste application to a tool is selected. As shown in FIG. 7, the display control unit 214 displays the machining program 231 by highlighting the blocks having a degree of separation of "Medium" or "Far" using, for example, a green background color (shading in FIG. 7) in a case where the paste application to a tool is selected.

Figure 8:
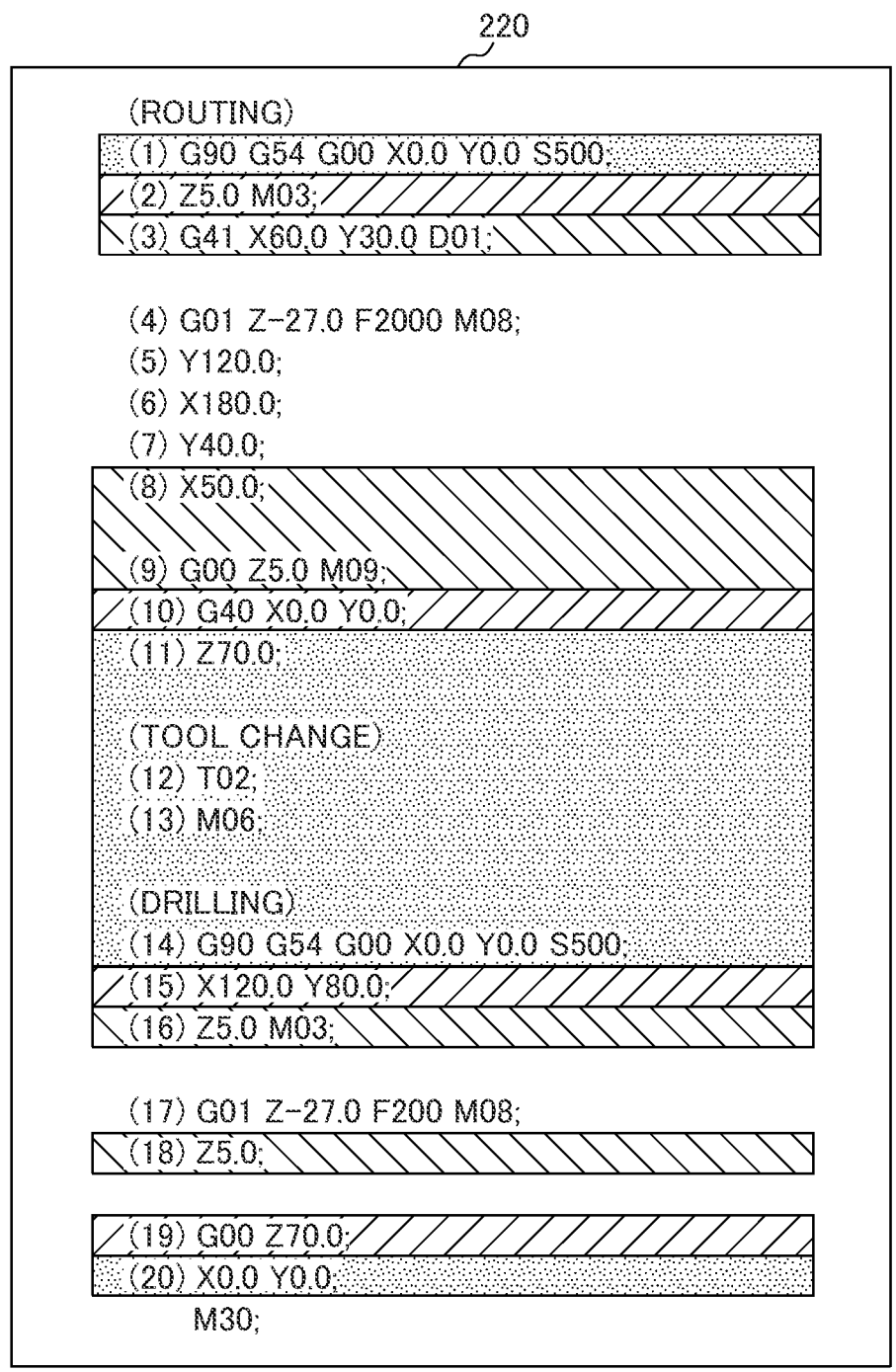
FIG. 8 is a diagram showing an example of the machining program being displayed in a highlighted manner according to the degree of separation.

Alternatively, the display control unit 214 may display, for example, the machining program 231 on the display unit 220 in a highlighted display manner to distinguish the extracted blocks by the degree of separation using, for example, border color, border type, border thickness, and background color as shown in FIG. 8. For example, in FIG. 8, the blocks having a degree of separation of "Close" are displayed by being highlighted using a red background color (shading with left to right descending diagonal lines in FIG. 8). For another example, the blocks having a degree of separation of "Medium" are displayed by being highlighted using a green background color (shading with left to right ascending diagonal lines in FIG. 8). For another example, the blocks having a degree of separation of "Far" are displayed by being highlighted using a blue background color (shading with dots in FIG. 8).

This configuration allows the control device 20 to easily recognize the positional relationship between the tool and the workpiece W in the machining program 231 and to easily insert a pause instruction according to the purpose without placing a burden on the operator.

<Display Processing by Control Device 20>

Figure 9:
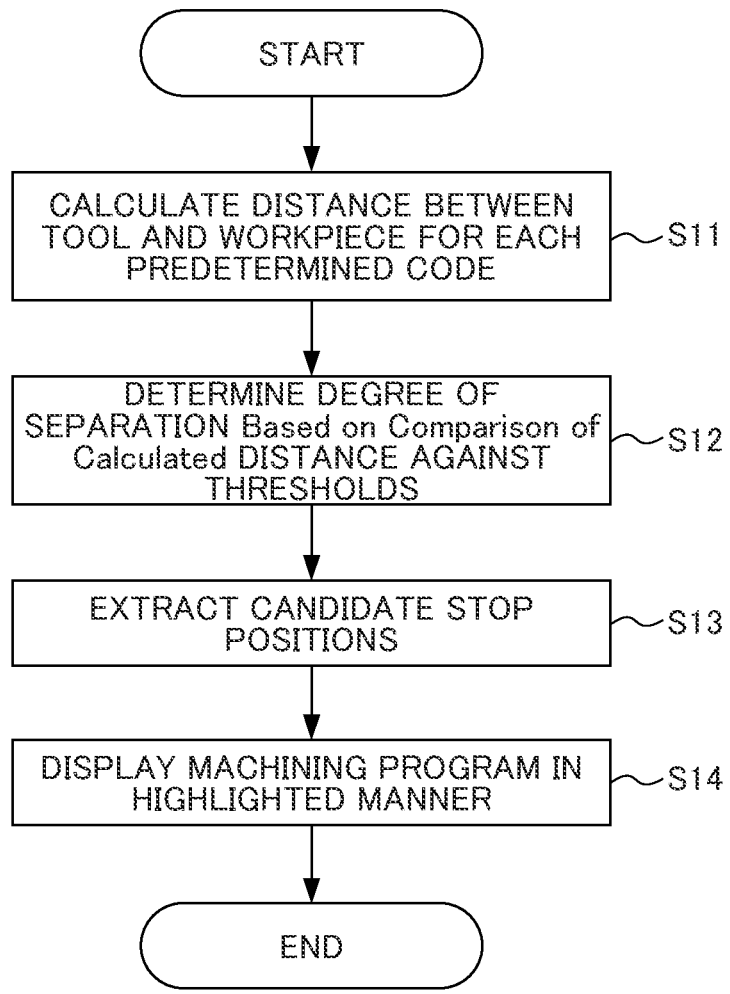
FIG. 9 is a flowchart for explaining display processing by a control device.

The following describes the flow of display processing to be performed by the control device 20 with reference to FIG. 9.

FIG. 9 is a flowchart for explaining the display processing by the control device 20. The flow shown herein is executed each time the machining program 231 is edited by the program editing unit 211.

In Step S11, the calculation unit 212 calculates the distance D between the tool and the workpiece W for each predetermined code G00 included in the machining program 231 being edited by the program editing unit 211.

In Step S12, the calculation unit 212 determines the degree of separation based on comparison of the distance D between the tool and the workpiece W calculated in Step S11 against the thresholds Th1, Th2, and Th3.

In Step S13, based on the degree of separation determined in Step S12, the extraction unit 213 extracts, as candidate stop positions, blocks from the machining program 231 according to the purpose or the degree of separation selected by the operator.

In Step S14, the display control unit 214 displays, on the display unit 220, each of the blocks extracted from the machining program 231 as candidate stop positions in a highlighted manner.

As described above, the control device 20 according to the first embodiment calculates the distance D between the tool and the workpiece W for each predetermined code G00 in the machining program 231 being edited, and determines the degree of separation according to the calculated distance D. Based on the degree of separation, the control device 20 extracts, as candidate stop positions, blocks from the machining program 231 according to the purpose or the degree of separation selected by the operator and displays, on the display unit 220, each of the blocks extracted as candidate stop positions in a highlighted manner.

This configuration allows the control device 20 to easily recognize the positional relationship between the tool and the workpiece W in the machining program 231 and to easily insert a pause instruction according to the purpose without placing a burden on the operator.

Furthermore, by displaying each of the blocks extracted as candidate stop positions in a highlighted manner, the control device 20 can prevent a pause instruction from being inserted into an inappropriate position and a stop from being caused at the inappropriate position.

The first embodiment has been described above.

Second Embodiment

The following describes a second embodiment. A control device 20A according to the second embodiment further has a function of pre-reading multiple blocks in a machining program in addition to the function according to the first embodiment.

Thus, the control device 20A according to the second embodiment can easily recognize the positional relationship between the tool and the workpiece in the machining program and cause a stop at an appropriate position, even when the machining program is running.

The following describes the second embodiment.

Figure 10:
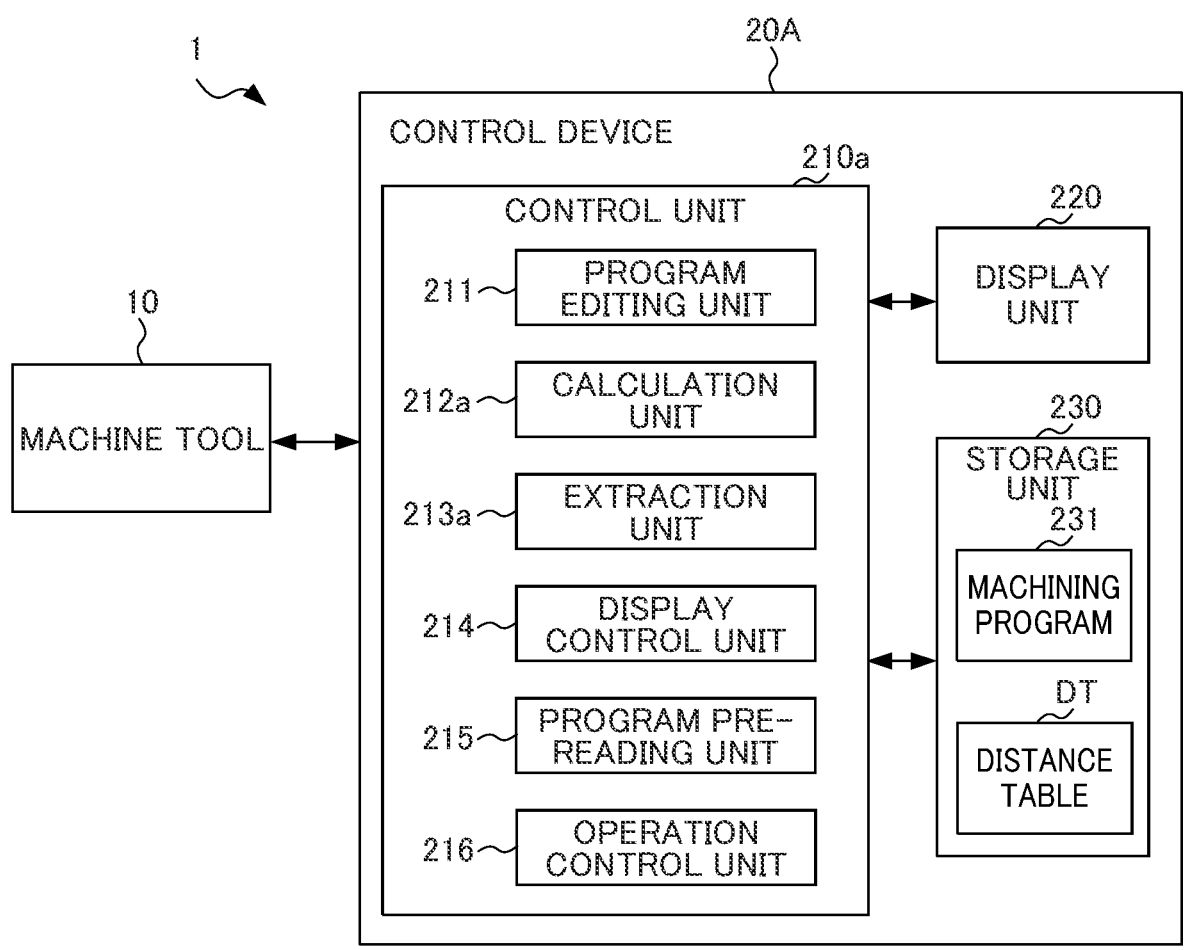
FIG. 10 is a functional block diagram showing a functional configuration example of a control system according to a second embodiment.

FIG. 10 is a functional block diagram showing a functional configuration example of a control system according to the second embodiment. It should be noted that elements having the same functions as their corresponding elements of the control system 1 in FIG. 1 are denoted by the same reference numerals, and detailed description of such elements will be omitted.

As shown in FIG. 10, a control system 1 according to the second embodiment includes a machine tool 10 and the control device 20A.

<Control Device 20A>

The control device 20A according to the second embodiment has the same configuration as the control device 20 according to the first embodiment.

Specifically, as shown in FIG. 9, the control device 20A has a control unit 210a, a display unit 220, and a storage unit 230. The control unit 210a includes a program editing unit 211, a calculation unit 212a, an extraction unit 213a, a display control unit 214, a program pre-reading unit 215, and an operation control unit 216. The storage unit 230 stores therein a machining program 231 and a distance table DT.

The machine tool 10 has the same function as the machine tool 10 in the first embodiment.

The display unit 220 and the storage unit 230 have the same functions as the display unit 220 and the storage unit 230 in the first embodiment.

The program editing unit 211 and the display control unit 214 have the same functions as the program editing unit 211 and the display control unit 214 in the first embodiment.

The program pre-reading unit 215 pre-reads, for example, multiple blocks in the machining program 231 when the machining program 231 is executed. The program pre-reading unit 215 outputs, to the calculation unit 212a, the multiple blocks pre-read.

Like the calculation unit 212 in the first embodiment, the calculation unit 212a calculates the distance D between the tool and the workpiece W for each predetermined code G00 included in the multiple blocks pre-read. The calculation unit 212a determines the degree of separation based on comparison of the calculated distance D between the tool and the workpiece W against thresholds Th1, Th2, and Th3. The calculation unit 212a then stores, in the distance table DT in the storage unit 230, an x-coordinate, a y-coordinate, a z-coordinate, a square value $D^2$ of the distance between the tool and the workpiece W, the distance D between the tool and the workpiece W, and the degree of separation for each of the blocks for which the distance D has been calculated.

Based on the distance table DT, for example, the extraction unit 213a extracts, as a candidate stop position, a block that is appropriate according to the purpose, such as diameter adjustment for a boring tool, paste application to a tool, or chip removal, and that is closest to the currently executed block among the blocks pre-read.

Specifically, in a case where the operator selects the diameter adjustment for a boring tool through an input device (not shown) of the control device 20a, for example, the extraction unit 213a extracts, as a candidate stop position, a block that has a degree of separation of "Far" as a predetermined state and that is closest to the currently executed block.

For another example, in a case where the operator selects the paste application to a tool through the input device (not shown) of the control device 20a, the extraction unit 213a may extract, as a candidate stop position, a block that has a degree of separation of "Medium" or "Far" as a predetermined state and that is closest to the currently executed block. For another example, in a case where the operator selects the chip removal through the input device (not shown) of the control device 20a, the extraction unit 213a may extract, as a candidate stop position, a block that has a degree of separation of "Close", "Medium", or "Far" as a predetermined state and that is closest to the currently executed block.

It should be noted that the extraction unit 213a may extract, as a candidate stop position, a block that is closest to the currently executed block according to the degree of separation based on the distance table DT. That is, in a case where the operator selects a degree of separation of "Close", "Medium", or "Far" through the input device (not shown) of the control device 20a, the extraction unit 213a may extract, as a candidate stop position, a block that is closest to the currently executed block and that has the selected degree of separation.

The operation control unit 216 monitors and controls the state of operation of the machine tool 10.

Specifically, the operation control unit 216 automatically adds a pause instruction as a break point to the candidate stop position extracted by the extraction unit 213a.

Thus, the control device 20A can cause a stop at a position where the positional relationship between the tool and the workpiece W is appropriate in the machining program 231 even when the machining program 231 is running.

<Operation Control Processing by Control Device 20A>

Figure 11:
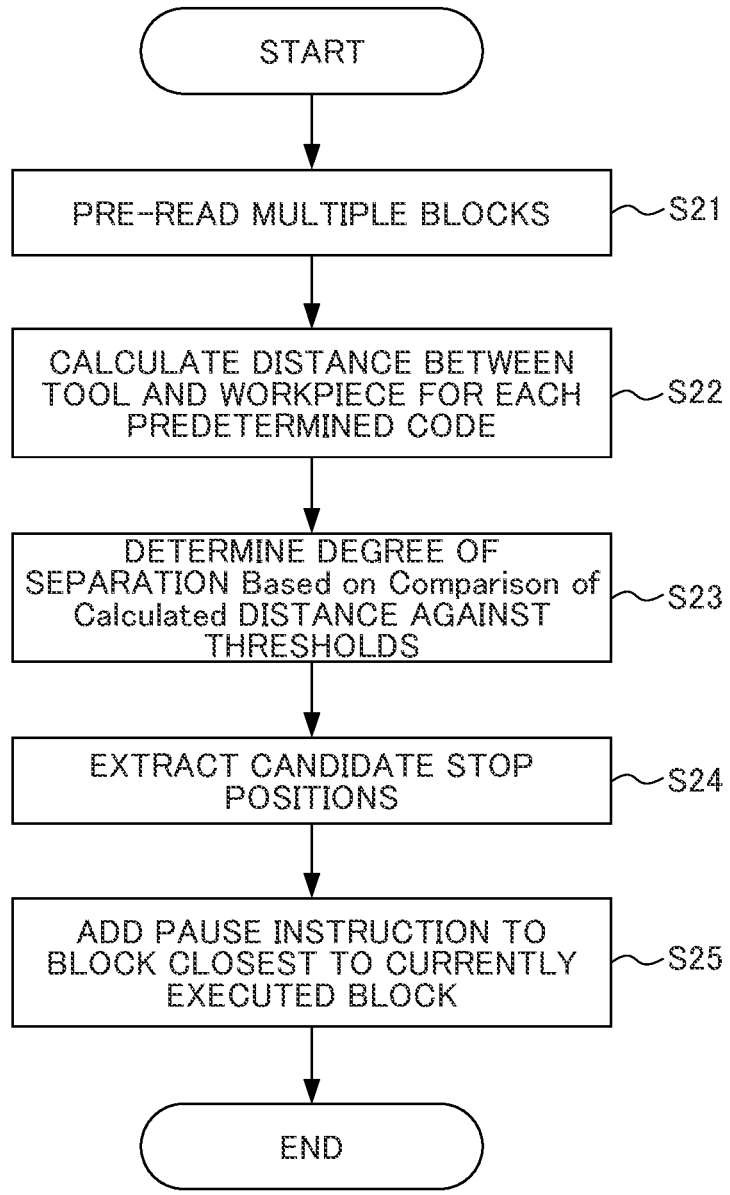
FIG. 11 is a flowchart for explaining operation control processing by a control device.

The following describes the flow of operation control processing to be performed by the control device 20A with reference to FIG. 11.

FIG. 11 is a flowchart for explaining the operation control processing by the control device 20A.

In Step S21, the program pre-reading unit 215 pre-reads multiple blocks in the machining program 231 that is running.

In Step S22, the calculation unit 212a calculates the distance D between the tool and the workpiece W for each predetermined code G00 included in the multiple blocks pre-read in Step S21.

In Step S23, the calculation unit 212a performs the same processing as in Step S12 according to the first embodiment, and determines the degree of separation based on comparison of the distance D between the tool and the workpiece W calculated in Step S22 against the thresholds Th1, Th2, and Th3.

In Step S24, based on the degree of separation determined in Step S23, the extraction unit 213a extracts, as a candidate stop position, a block that is appropriate according to the purpose or the degree of separation selected by the operator and that is closest to the currently executed block among the multiple blocks pre-read.

In Step S25, the operation control unit 216 automatically adds a pause instruction as a break point to the candidate stop position extracted in Step S24.

As described above, the control device 20A according to the second embodiment calculates the distance D between the tool and the workpiece W for each predetermined code G00 included in the multiple blocks pre-read from the currently running machining program, and determines the degree of separation according to the calculated distance D between the tool and the workpiece W. Based on the degree of separation, the control device 20A extracts, as a candidate stop position, a block that is appropriate according to the purpose or the degree of separation selected by the operator and that is closest to the currently executed block, and automatically adds a pause instruction as a break point to the extracted block.

This configuration allows the control device 20A to easily recognize the positional relationship between the tool and the workpiece W and to cause a stop in a block where the positional relationship between the tool and the workpiece is appropriate according to the purpose, even when the machining program 231 is running.

Furthermore, by automatically adding a pause instruction as a break point to the extracted candidate stop position, the control device 20A can prevent a pause instruction from being inserted into an inappropriate position and a stop from being caused at the inappropriate position, reducing the burden on the operator.

The second embodiment has been described above.

Although the first embodiment and the second embodiment have been described above, the control devices 20 and 20 A are not limited to the embodiments described above, and encompass changes such as modifications and improvements to the extent that the object of the present invention is achieved.

Modification Example

In the first embodiment and the second embodiment described above, the predetermined code is G00. However, the present invention is not limited as such. For example, the predetermined code may be another code such as G28 or M06.

Specifically, G28 is a G code for return to reference point (machine origin). That is, the tool is essentially in a position far away from the workpiece W at the end of a block including G28, and therefore it is possible to perform diameter adjustment for a boring tool, paste application to a tool, and chip removal there.

M06 is an M code for tool change. As described above, the tool change is performed at a predetermined position away from the workpiece W using, for example, a tool magazine (not shown) included in the machine tool 10, and therefore it is possible to perform diameter adjustment for a boring tool, paste application to a tool, and chip removal there.

It is possible to perform the chip removal regardless of the degree of separation as long as the tool is out of contact with the workpiece W. The control devices 20 and 20A may therefore determine whether or not the tool and the workpiece W are separated for each block by determining, for example, whether or not the block includes a code belonging to Group 01 such as G01 or G02 among the G codes, or whether or not the block includes a code M05. That is, the tool is in contact with the workpiece W in a block including a code belonging to Group 01 such as G01 or G02, and therefore the control devices 20 and 20A may determine that the chip removal cannot be performed until a block including G00 is detected. The tool and the workpiece W are at least separated in a block including a code M05 for spindle stop, and therefore the control devices 20 and 20A may determine that the chip removal can be performed there.

Each of the functions of the control devices 20 and 20A according to the first embodiment and the second embodiment can be implemented by hardware, software, or a combination thereof. Being implemented by software herein means being implemented through a computer reading and executing a program.

The program can be supplied to the computer by being stored on any of various types of non-transitory computer readable media. The non-transitory computer readable media include various types of tangible storage media. Examples of non-transitory computer readable media include magnetic storage media (such as flexible disks, magnetic tape, and hard disk drives), magneto-optical storage media (such as magneto-optical disks), compact disc read only memory (CD-ROM), compact disc recordable (CD-R), compact disc rewritable (CD-R/W), and semiconductor memory (such as mask ROM, programmable ROM (PROM), erasable PROM (EPROM), flash ROM, and RAM). Alternatively, the program may be supplied to the computer using any of various types of transitory computer readable media. Examples of transitory computer readable media include electrical signals, optical signals, and electromagnetic waves. Such transitory computer readable media are able to supply the program to the computer through a wireless communication channel or a wired communication channel such as electrical wires or optical fibers.

It should be noted that writing the program to be recorded on a storage medium includes processes that are not necessarily performed chronologically and that may be performed in parallel or individually as well as processes that are performed chronologically according to the order thereof.

To put the foregoing into other words, the control device and the control method according to the present disclosure can take various embodiments having the following configurations.

(1) A control device 20 according to an aspect of the present disclosure is a control device for controlling a machine tool 10 based on a machining program 231. The control device includes an extraction unit 213 configured to extract, as candidate stop positions from among blocks included in the machining program 231, blocks from the machining program 231 that cause a tool and a workpiece W in the machine tool 10 to be in a predetermined state according to a purpose of stopping the machine tool 10.

According to the control device 20, it is possible to easily recognize the positional relationship between the tool and the workpiece W in the machining program 231.

(2) The control device 20 descried in (1) may further include a calculation unit 212 configured to calculate a distance D between the tool and the workpiece W for each of blocks including a predetermined code, and determine a degree of separation between the tool and the workpiece W based on comparison of the calculated distance D against preset thresholds Th1, Th2, and Th3. The extraction unit 213 may extract the candidate stop positions according to the purpose or the degree of separation.

This configuration allows the control device 20 to recognize the positional relationship between the tool and the workpiece W in the machining program 231 with high accuracy.

(3) The control device 20 described in (2) may further include a display control unit 214 configured to display, on a display unit 220 of the control device 20, each of the blocks extracted from the machining program 231 as the candidate stop positions in a highlighted manner according to the purpose or the degree of separation.

This configuration allows the control device 20 to easily insert a pause instruction according to the purpose without placing a burden on an operator.

(4) The control device 20A described in (2) or (3) may further include: a program pre-reading unit 215 configured to pre-read multiple blocks in the machining program 231 when the machining program 231 is running; and an operation control unit 216. The extraction unit 213a may extract, as a candidate stop position, a block that is appropriate according to the purpose or the degree of separation and that is closest to a currently executed block among the multiple blocks pre-read by the program pre-reading unit 215. The operation control unit 216 adds a pause instruction to the block thus extracted from the machining program as the candidate stop position by the extraction unit 213a.

This configuration allows the control device 20A to cause a stop at a position where the positional relationship between the tool and the workpiece W is appropriate in the machining program 231 even when the machining program 231 is running.

(5) A control method according to another aspect of the present disclosure is a control method of a control device 20 for controlling a machine tool 10 based on a machining program 231. The control method includes an extraction step of extracting, as candidate stop positions from among blocks included in the machining program 231, blocks from the machining program 231 that cause a tool and a workpiece W in the machine tool 10 to be in a predetermined state according to a purpose of stopping the machine tool 10.

According to this control method, it is possible to produce the same effect as described in (1).

(6) The control method described in (5) may further include a calculation step of calculating a distance D between the tool and the workpiece W for each of blocks including a predetermined code, and determining a degree of separation between the tool and the workpiece W based on comparison of the calculated distance D against preset thresholds Th1, Th2, and Th3. In the extraction step, the candidate stop positions may be extracted according to the purpose or the degree of separation.

This configuration allows the control method to produce the same effect as described in (2).

(7) The control method described in (6) may further include a display control step of displaying, on a display unit 220 of the control device 20, each of the blocks extracted from the machining program 231 as the candidate stop positions in a highlighted manner according to the purpose or the degree of separation.

This configuration allows the control method to produce the same effect as described in (3).

(8) The control method described in (6) or (7) may further include: a program pre-reading step of pre-reading multiple blocks in the machining program 231 when the machining program 231 is running; and an operation control step. In the extraction step, a block that is appropriate according to the purpose or the degree of separation and that is closest to a currently executed block may be extracted as a candidate stop position among the multiple blocks pre-read. In the operation control step, a pause instruction is added to the block thus extracted from the machining program 231 as the candidate stop position in the extraction step.

This configuration allows the control method to produce the same effect as described in (4).

EXPLANATION OF REFERENCE NUMERALS

1: Control system
10: Machine tool
20, 20A: Control device
210, 210a: Control unit
211: Program editing unit
212, 212a: Calculation unit
213, 213a: Extraction unit
214: Display control unit
215: Program pre-reading unit
216: Operation control unit
220: Display unit
230: Storage unit

The invention claimed is:

1. A control device for controlling a machine tool based on a machining program, the control device comprising:
a memory configured to store a program; and
a processor configured to execute the program and control the control device to:
extract, as candidate stop positions from among blocks included in the machining program, blocks from the machining program that cause a tool and a workpiece in the machine tool to be in a predetermined state according to a purpose of stopping the machine tool, and
calculate a distance between the tool and the workpiece for each of blocks including a predetermined code, and determine a degree of separation between the tool and the workpiece based on comparison of the calculated distance against a preset threshold, wherein
the purpose of stopping the machine tool includes a plurality of purposes each with a different degree of separation between the required tool and the workpiece,
the processor extracts the candidate stop positions according to the purpose and the degree of separation.

2. The control device according to claim 1,
wherein the processor displays, on a display unit of the control device, each of the blocks extracted from the machining program as the candidate stop positions in a highlighted manner according to the purpose or the degree of separation.

3. The control device according to claim 1,
wherein the processor pre-reads multiple blocks in the machining program when the machining program is running; and
wherein the processor extracts, as a candidate stop position, a block that is appropriate according to the purpose or the degree of separation and that is closest to a currently executed block among the multiple blocks pre-read by the program pre reading unit, and
wherein the processor adds a pause instruction to the block thus extracted from the machining program as the candidate stop position by the extraction unit.

4. A control method of a control device for controlling a machine tool based on a machining program, the control device including a memory configured to store a program; and a processor configured to execute the program and control the control device to perform the control method, the control method comprising:
extracting, as candidate stop positions from among blocks included in the machining program, blocks from the machining program that cause a tool and a workpiece in the machine tool to be in a predetermined state according to a purpose of stopping the machine tool, and
calculating a distance between the tool and the workpiece for each of blocks including a predetermined code, and determine a degree of separation between the tool and the workpiece based on comparison of the calculated distance against a preset threshold, wherein
the purpose of stopping the machine tool includes a plurality of purposes each with a different degree of separation between the required tool and the workpiece,
the processor extracts the candidate stop positions according to the purpose and the degree of separation.

5. The control method according to claim 4, further comprising:
displaying, on a display unit of the control device, each of the blocks extracted from the machining program as the candidate stop positions in a highlighted manner according to the purpose or the degree of separation.

6. The control method according to claim 4, further comprising:
pre-reading multiple blocks in the machining program when the machining program is running; and
in the extraction, a block that is appropriate according to the purpose or the degree of separation and that is closest to a currently executed block is extracted as a candidate stop position among the multiple blocks pre-read, and
a pause instruction is added to the block thus extracted from the machining program as the candidate stop position in the extraction.

* * * * *